US011173977B1

(12) United States Patent
Chen

(10) Patent No.: US 11,173,977 B1
(45) Date of Patent: Nov. 16, 2021

(54) BICYCLE RIDING TAILLIGHT WITH BRAKE LASER WARNING

(71) Applicant: Shenzhen Gaciron Technology Co., Ltd, Shenzhen (CN)

(72) Inventor: Xiangbao Chen, Shenzhen (CN)

(73) Assignee: SHENZHEN GACIRON TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 16/952,264

(22) Filed: Nov. 19, 2020

(30) Foreign Application Priority Data

Jul. 16, 2020 (CN) .......................... 202021402715.7

(51) Int. Cl.
| | |
|---|---|
| *B62J 6/045* | (2020.01) |
| *F21V 23/04* | (2006.01) |
| *F21V 23/06* | (2006.01) |
| *F21S 43/13* | (2018.01) |
| *B62J 6/04* | (2020.01) |
| *B62J 6/015* | (2020.01) |
| *F21V 21/08* | (2006.01) |
| *F21W 107/13* | (2018.01) |
| *F21W 103/35* | (2018.01) |

(52) U.S. Cl.
CPC .............. *B62J 6/045* (2020.02); *B62J 6/015* (2020.02); *B62J 6/04* (2013.01); *F21S 43/13* (2018.01); *F21V 21/0816* (2013.01); *F21V 23/0464* (2013.01); *F21V 23/0492* (2013.01); *F21V 23/06* (2013.01); *F21W 2103/35* (2018.01); *F21W 2107/13* (2018.01)

(58) Field of Classification Search
CPC .... B62J 6/015; B62J 6/04; B62J 6/045; F21S 43/13; F21V 21/0816; F21V 23/0464; F21V 23/0492; F21V 23/06; F21W 2103/35; F21W 2107/13
See application file for complete search history.

(56) References Cited

U.S. PATENT DOCUMENTS

| | | | |
|---|---|---|---|
| 2008/0219014 A1* | 9/2008 | Loibl .......................... | B62J 6/00 362/473 |
| 2010/0283590 A1* | 11/2010 | Tee ............................ | B62J 6/04 340/432 |
| 2011/0187517 A1* | 8/2011 | Roths ....................... | G08B 21/00 340/432 |
| 2012/0112635 A1* | 5/2012 | Cho ........................... | B62J 6/04 315/79 |

(Continued)

*Primary Examiner* — Zheng Song
(74) *Attorney, Agent, or Firm* — Gottlieb, Rackman & Reisman, P.C

(57) ABSTRACT

Disclosed is a bicycle riding taillight with brake laser warning, which includes: a light housing comprising a housing body and a bottom cover sealing the housing body; a circuit board disposed inside the light housing; a light source device, disposed on an inner side of the bottom cover and electrically connected to the circuit board, and configured to provide lights of different modes; a power source disposed on one side of the circuit board, and configured to provide power for the light source device; a photosensitive sensor disposed at one end of the light housing and connected to the circuit board, and configured to sense ambient light; and a vibration sensor disposed inside the light housing and located at one end of the circuit board, and configured to sense a riding condition of a bicycle.

8 Claims, 6 Drawing Sheets

(56) References Cited

U.S. PATENT DOCUMENTS

| | | | | |
|---|---|---|---|---|
| 2013/0307678 A1* | 11/2013 | Ransom | .................... | B62J 6/04 |
| | | | | 340/432 |
| 2015/0102919 A1* | 4/2015 | Hsu | ........................ | B62J 7/02 |
| | | | | 340/432 |
| 2015/0158538 A1* | 6/2015 | Liao | ........................ | B62L 1/00 |
| | | | | 362/473 |
| 2016/0001836 A1* | 1/2016 | Lee | ........................ | B62J 6/02 |
| | | | | 362/475 |
| 2016/0138254 A1* | 5/2016 | Chimene | ................. | E03D 9/00 |
| | | | | 4/661 |
| 2016/0200383 A1* | 7/2016 | McAleese | ................ | B62J 6/01 |
| | | | | 315/79 |
| 2017/0184259 A1* | 6/2017 | Li | ........................ | F21V 21/084 |
| 2018/0111654 A1* | 4/2018 | Emerson | ............... | F21V 23/004 |
| 2019/0329703 A1* | 10/2019 | Chen | ........................ | B62L 3/00 |
| 2020/0189679 A1* | 6/2020 | Walford | ................... | B62J 6/01 |

\* cited by examiner

BICYCLE RIDING TAILLIGHT WITH BRAKE LASER WARNING

CROSS-REFERENCE TO RELATED APPLICATION

This application claims priority to Chinese patent application No. 202021402715.7, filed Jul. 16, 2020. The content of which is incorporated herein by reference in its entirety.

TECHNICAL FIELD

The present disclosure relates to the technical field of bicycle riding taillights, and more particularly, to a bicycle riding taillight with brake laser warning.

BACKGROUND

When a bicycle is used at night or in a relatively dark environment, it is usually dangerous, especially behind a cyclist. Therefore, it is generally necessary to dispose a taillight at the rear of the bicycle, so that a vehicle behind the bicycle can recognize. In the existing technology, a taillight is turned on in a relatively dark environment, but when a bicycle needs to be stopped in case of emergency or when a corner is encountered, due to visual adaptability of human eyes to a color, it is difficult for a person or a vehicle behind the bicycle to immediately find this change in a riding condition of the bicycle in the front. As a result, this may cause some accidents and is not conducive to riding safety.

Therefore, a bicycle riding taillight with brake laser warning needs to be provided to resolve the foregoing technical problem.

SUMMARY

The present disclosure provides a bicycle riding taillight with brake laser warning. A vibration sensor is provided to detect a riding condition of a bicycle, and lights of different modes are turned on according to the riding condition, so that a person or a vehicle behind the bicycle immediately notices a change in the riding condition of the bicycle, and takes proper evasive actions in time, thereby avoiding an accident and improving riding safety, and addressing a problem that a person or a vehicle behind a cyclist cannot respond quickly.

To address the foregoing technical problem, a technical scheme adopted by the present disclosure is as follows:

A bicycle riding taillight with brake laser warning, which includes:

a light housing comprising a housing body and a bottom cover sealing the housing body;

a circuit board disposed inside the light housing;

a light source device, disposed on an inner side of the bottom cover and electrically connected to the circuit board, and configured to provide lights of different modes;

a power source disposed on one side of the circuit board, and configured to provide power for the light source device;

a photosensitive sensor disposed at one end of the light housing and connected to the circuit board, and configured to sense ambient light; and a vibration sensor disposed inside the light housing and located at one end of the circuit board, and configured to sense a riding condition of a bicycle, where the vibration sensor is configured to transmit the sensed riding condition of the bicycle to the light source device, and the light source device is configured to turn on lights of different modes.

The bicycle riding taillight according to some embodiments of the present disclosure, where the light source device comprises a laser module and a red light module;

the photosensitive sensor is configured to generate a first conduction signal in response to detecting that external light is insufficient, the circuit board is configured to receive the first conduction signal, a circuit of the red light module is conducted, and the red light module is turned on; and the vibration sensor is configured to generate a second conduction signal in response to detecting that the bicycle brakes or makes a turn, the circuit board is configured to receive the second conduction signal, and the laser module is turned on.

The bicycle riding taillight according to some embodiments of the present disclosure, where the laser module is a color laser module, a blue laser module, a yellow laser module, or a green laser module; and the red light module is disposed on the bottom cover, and the bottom cover is a transparent end cover made of transparent material.

The bicycle riding taillight according to some embodiments of the present disclosure, where the laser module is a laser module configured to emit laser light to form a circular structure, a square structure, or a long strip structure on the ground, and disposed at one end of the bottom cover, the bottom cover is provided with a laser light outlet corresponding to the laser module, and the laser light outlet is provided with a lens.

The bicycle riding taillight according to some embodiments of the present disclosure, where an included angle between an axis of the laser light outlet and the ground is 8° to 13°.

The bicycle riding taillight according to some embodiments of the present disclosure, where: the power source comprises a charging port; the charging port is disposed in the middle of one side of the housing body and is configured to charge the power source, and a charging cover for covering the charging port is disposed at an upper end of the charging port.

The bicycle riding taillight according to some embodiments of the present disclosure, where: an upper end face of the housing body is provided with a fastening means fastened on the bicycle; the fastening means comprises a connecting portion connected to the bicycle, and a first binding portion and a second binding portion for binding; the first binding portion and the second binding portion are separately located on two sides of the connecting portion; the connecting portion and the first binding portion and the second binding portion are an integral structure; and the fastening means is detachably connected to the light housing.

The bicycle riding taillight according to some embodiments of the present disclosure, where: a surface of the connecting portion in contact with the bicycle is an arc concave surface configured to stably fastened on the bicycle;

an upper end surface of the housing body is provided with a connecting hook detachably connected to the connecting portion, the connecting portion is provided with a through hole passing through the connecting portion, and the fastening means and the light housing are detachably connected to the connecting hook through the through hole.

The bicycle riding taillight according to some embodiments of the present disclosure, where: the second binding portion is provided with a second fastening hole, and the first binding portion is provided with a first fastening hole;

the first binding portion is provided with a hook means, configured to fasten the light housing on the bicycle through the first fastening hole and the second fastening hole; and a plurality of the first fastening holes and the second fastening holes are provided, and the hook means is detachably disposed at the first fastening hole.

The bicycle riding taillight according to some embodiments of the present disclosure, where the fastening means is a flexible fastening means made of flexible material.

The bicycle riding taillight according to some embodiments of the present disclosure, where: an upper end surface of the housing body is provided with a fastening means fastened on the bicycle, and a connecting hook detachably disposed at the fastening means; and the fastening means comprises:

a first fastening rotating member, where a lower portion of the first fastening rotating member is provided with a connection through slot connected to the connecting hook, an upper portion of the first fastening rotating member is provided with a first cylindrical rotating connecting portion and a first arc-shaped connecting portion connected to the first cylindrical connecting portion, and the first cylindrical rotating connecting portion comprises a rotating through slot located in the middle of the first cylindrical rotating connecting portion and a first arc rotating surface located on top of the first cylindrical rotating connecting portion;

a second fastening rotating member comprising a cylindrical rotating connecting portion disposed at a lower portion of the second fastening rotating member, and a second arc-shaped connecting portion connected to the cylindrical rotating connecting portion, where the cylindrical rotating connecting portion comprises a second arc rotating surface on top of the cylindrical rotating connecting portion, and a protruding cylinder protruding outwards;

a binding member, where one end of the binding member is fastened on the first fastening rotating member and the second fastening rotating member, and the other end of the binding member is fastened on the bicycle; and a spring member, where the first fastening rotating member, the second fastening rotating member, and the binding member are connected through the spring member, where the first fastening rotating member and the second fastening rotating member are rotatably connected, the connection through slot is configured to cooperate with the protruding cylinder, the first arc rotating surface is configured to cooperate with the second arc rotating surface, and the first arc-shaped connecting portion is configured to cooperate with the second arc rotating surface.

The bicycle riding taillight according to some embodiments of the present disclosure, where: an end of the first cylindrical rotating connecting portion close to the first arc-shaped connecting portion is provided with a first latch; and an end of the cylindrical rotating connecting portion close to the second arc-shaped connecting portion is provided with a second latch; and the spring member comprises a tapping screw and a spring, the tapping screw passes through and is fastened on the first fastening rotating member, the second fastening rotating member, and the binding member, and the spring is disposed between the first fastening rotating member and the second fastening rotating member.

Compared with the existing art, the present disclosure has the following beneficial effects: the vibration sensor is configured to detect the riding condition of the bicycle, and lights of different modes are turned on according to the riding condition, so that a person or a vehicle behind the bicycle can immediately notice a change in the riding condition of the bicycle, and take proper evasive actions in time, thereby avoiding an accident and improving riding safety.

When the bicycle brakes or a braking tendency accompanying turning appears, the vibration sensor is configured to generate the second conduction signal upon detecting the braking of the bicycle or the braking tendency accompanying turning, and the laser module is turned on to emit a high-brightness laser beam, so as to clearly illuminate a path of the laser light and form a bright spot on the ground. Because the high-brightness laser beam is high in brightness, has a color different from that of light emitted by the red light module, and forms a distinct visual difference with the low-brightness red warning light in a non-braking condition, so that a person or a vehicle behind the bicycle can immediately notice the change in the riding condition of the bicycle.

BRIEF DESCRIPTION OF THE DRAWINGS

To more clearly describe embodiments of the present disclosure or technical schemes in the existing technology, the accompanying drawings required in the embodiments will be briefly described below, and the drawings described below are merely corresponding drawings of some embodiments of the present disclosure, in which.

Figure 1:
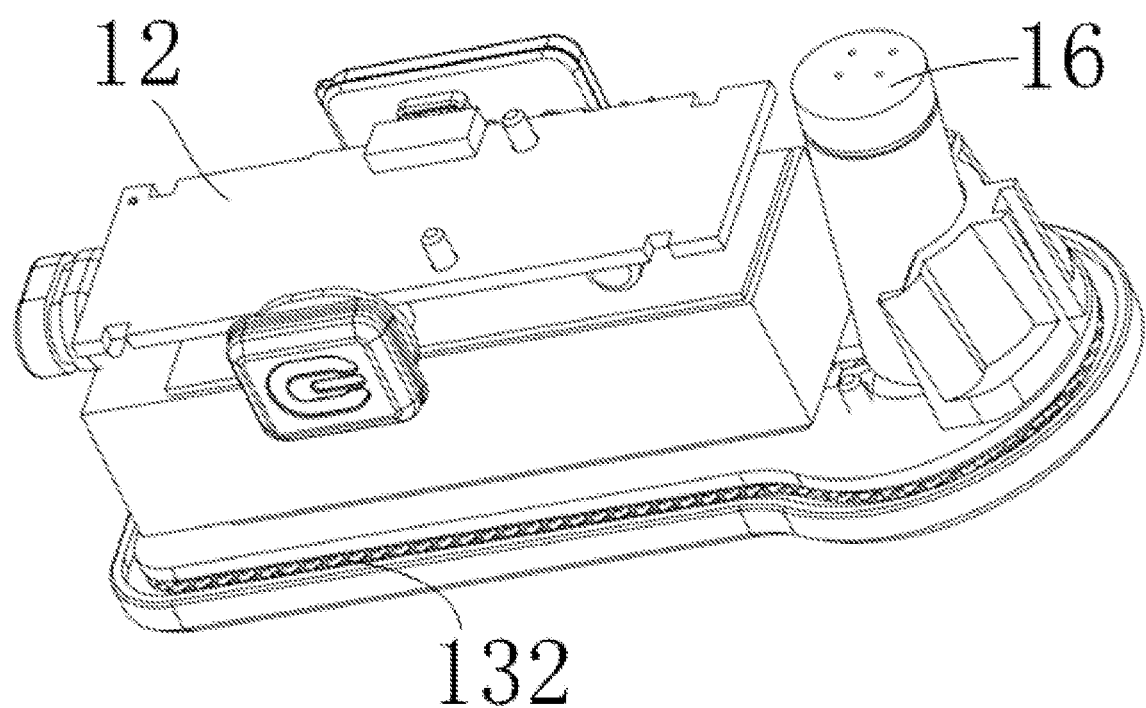
FIG. 1 is a partial schematic structural diagram of an embodiment of a bicycle riding taillight with brake laser warning according to the present disclosure.

Light housing 11, circuit board 12, power source 14, photosensitive sensor 15, vibration sensor 16, fastening means 17, hook means 18, connecting hook 19, laser module 131, red light module 132, laser light outlet 131a, power port 14a, connecting portion 171, first binding portion 172, second binding portion 173, arc concave surface 171a, through hole 171b, first fastening hole 172a, second fastening hole 173a, tapping screw 232, spring 231, first latch 215, second latch 224, connection through slot 214, rotating through slot 212, first arc rotating surface 213, second arc-shaped connecting portion 221, second arc rotating surface 222, protruding cylinder 223, and first arc-shaped connecting portion 211.

DETAILED DESCRIPTION

The technical schemes of the embodiments of the present disclosure will be clearly and completely described below with reference to the accompanying drawings of the embodiments of the present disclosure. Obviously, the described embodiments are merely some embodiments rather than all embodiments of the present disclosure. All other embodiments obtained by a person skilled in the art based on the embodiments of the present disclosure without creative work all fall within the protection scope of the present disclosure.

The following provides a preferred embodiment of a bicycle riding taillight with brake laser warning that can resolve the foregoing technical problem in the present disclosure.

In figures, units with similar structures are indicated by same reference numerals.

Terms such as "first" and "second" in the present disclosure are only used for descriptive purpose, and shall not be understood as indicating or suggesting relative importance or limiting the order.

A preferred embodiment of a bicycle riding taillight with brake laser warning provided in the present disclosure is as follows.

Figure 2:
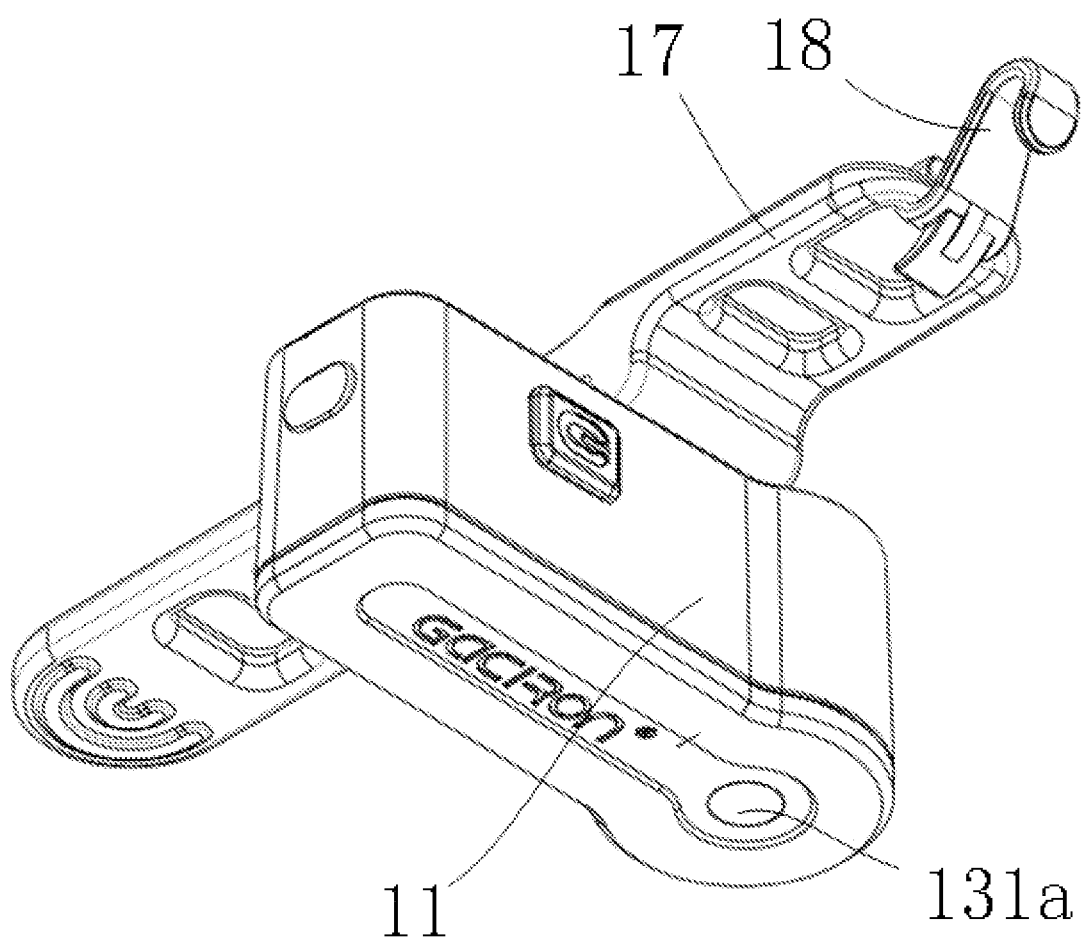
FIG. 2 is a schematic structural diagram of an embodiment of a bicycle riding taillight with brake laser warning according to the present disclosure.
Figure 3:
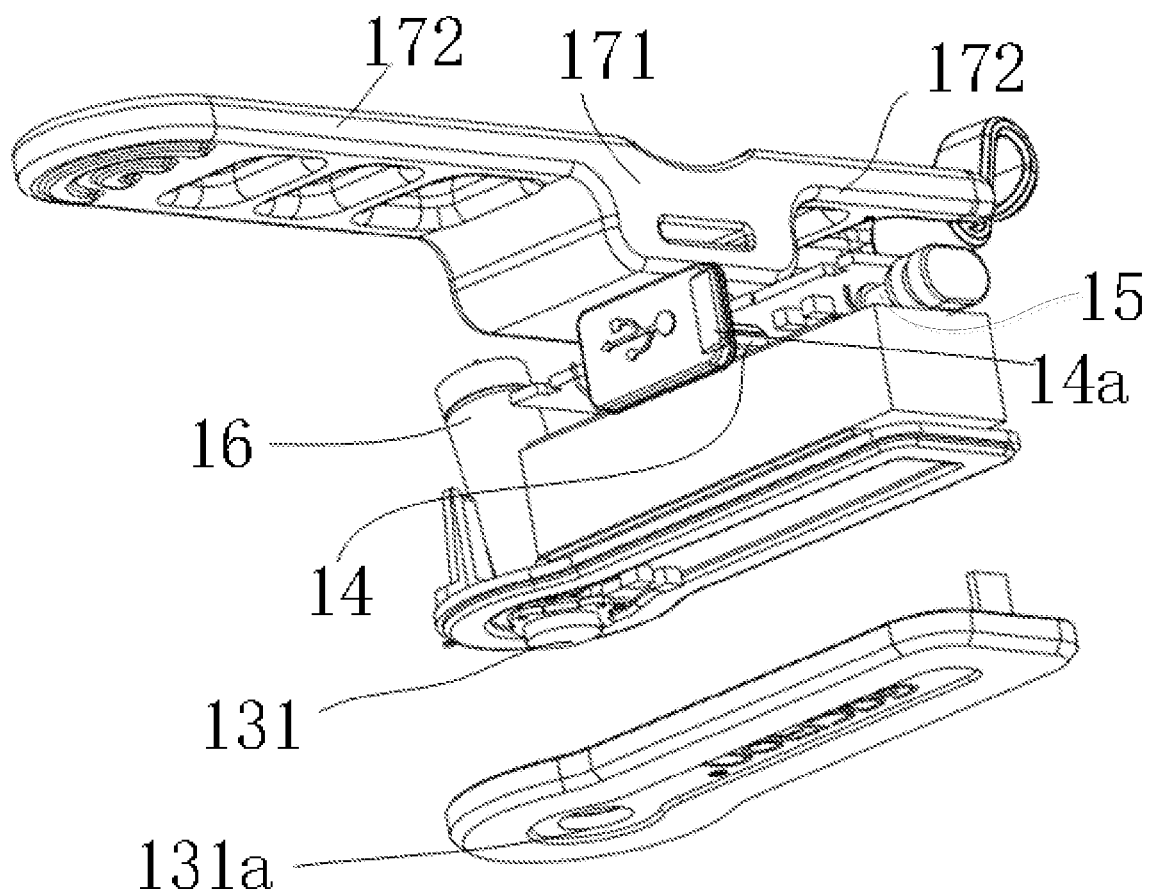
FIG. 3 is a partial exploded diagram of an embodiment of a bicycle riding taillight with brake laser warning according to the present disclosure.

Referring to FIG. 1, FIG. 2, and FIG. 3, FIG. 1 is a partial schematic structural diagram of an embodiment of a bicycle riding taillight with brake laser warning according to the present disclosure, FIG. 2 is a schematic structural diagram of an embodiment of a bicycle riding taillight with brake laser warning according to the present disclosure, and FIG. 3 is a partial exploded diagram of an embodiment of a bicycle riding taillight with brake laser warning according to the present disclosure.

A bicycle riding taillight with brake laser warning includes: a light housing 11, a circuit board 12, a light source device, a power source 14, a photosensitive sensor 15, and a vibration sensor 16. The light housing 11 includes a housing body and an end cover sealing the housing body. The circuit board 12 is disposed inside the light housing 11. The light source device is disposed on an inner side of the bottom cover and is electrically connected to the circuit board 12, and is configured to provide lights of different modes. The power source 14 is disposed on one side of the circuit board 12, and is configured to provide power for the light source device. The photosensitive sensor 15 is disposed at one end of the light housing 11 and is connected to the circuit board 12, and is configured to sense ambient light. The vibration sensor 16 is disposed inside the light housing 11 and is located at one end of the circuit board 12, and is configured to sense a riding condition of the bicycle, where the vibration sensor 16 is configured to transmit the sensed riding condition of the bicycle to the light source device, and the light source device is configured to turn on lights of different modes.

In this embodiment, the vibration sensor 16 detects the riding condition of the bicycle, and lights of different modes are turned on according to the riding condition, so that a person or a vehicle behind the bicycle can notice a change in the riding condition of the bicycle very quickly, and take proper evasive actions in time, thereby avoiding an accident and improving riding safety.

Figure 4:
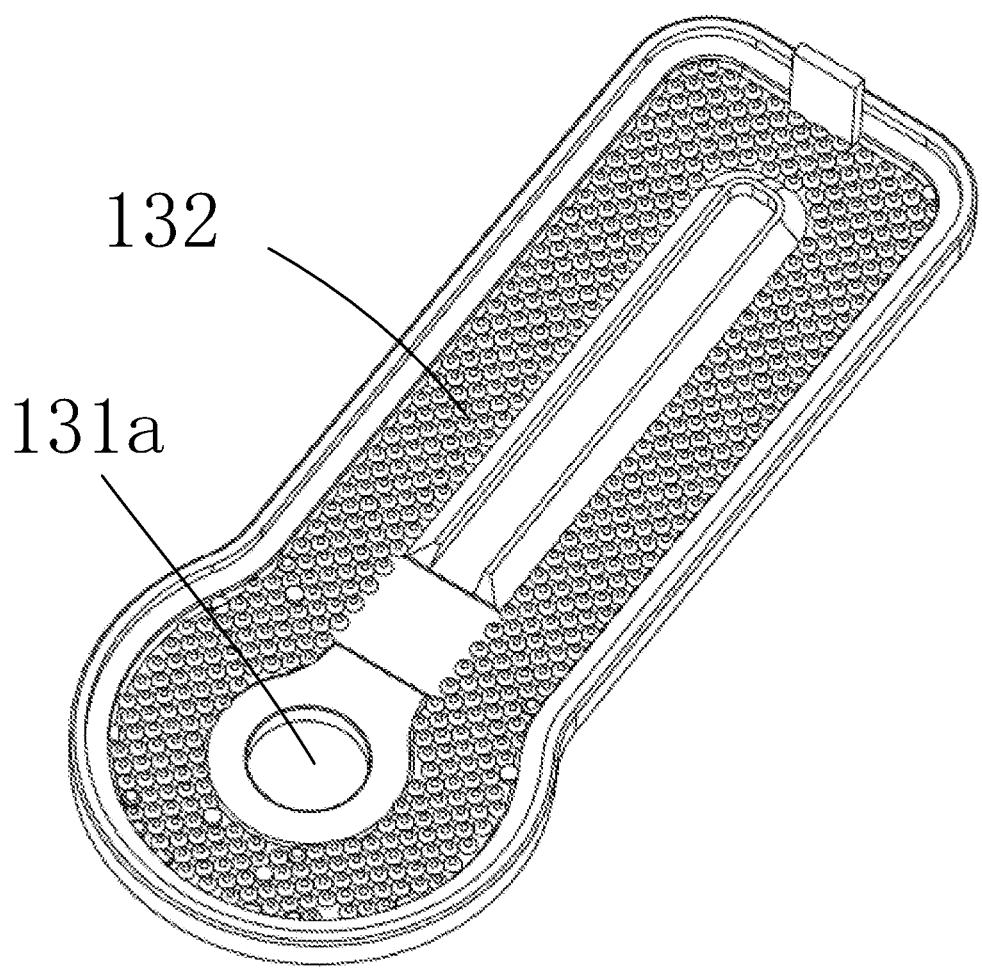
FIG. 4 is a schematic structural diagram of an end cover of an embodiment of a bicycle riding taillight with brake laser warning according to the present disclosure.

Referring to FIG. 1, FIG. 3, and FIG. 4, FIG. 1 is a partial schematic structural diagram of an embodiment of a bicycle riding taillight with brake laser warning according to the present disclosure, FIG. 3 is a partial exploded diagram of an embodiment of a bicycle riding taillight with brake laser warning according to the present disclosure, and FIG. 4 is a schematic structural diagram of a bottom cover of an embodiment of a bicycle riding taillight with brake laser warning according to the present disclosure.

In this embodiment, the light source device includes a laser module 131 and a red light module 132. The photosensitive sensor 15 generates a first conduction signal when detecting that external light is insufficient, the circuit board 12 receives the first conduction signal, a circuit of the red light module 132 is conducted, and the red light module 132 is turned on. When the circuit board 12 receives the first conduction signal and the vibration sensor 16 detects that the bicycle brakes or makes a turn, the vibration sensor 16 generates a second conduction signal, the circuit board 12 receives the second conduction signal, and the laser module 131 is turned on. When the bicycle brakes or a braking tendency accompanying turning appears, the vibration sensor 16 generates the second conduction signal upon detecting the braking of the bicycle or the braking condition accompanying turning, and the laser module 131 is turned on to emit a high-brightness laser beam, to clearly illuminate a path of laser light and form a bright spot on the ground. Because the high-brightness laser beam is high in brightness, has a color different from that of light emitted by the red light module, and forms a distinct visual difference with the low-brightness red warning light in a non-braking condition, so that a person or a vehicle behind the bicycle can immediately notice the change in the riding condition of the bicycle.

Referring to FIG. 1 and FIG. 4, FIG. 1 is a partial schematic structural diagram of an embodiment of a bicycle riding taillight with brake laser warning according to the present disclosure, and FIG. 4 is a schematic structural diagram of a bottom cover of an embodiment of a bicycle riding taillight with brake laser warning according to the present disclosure.

In this embodiment, to improve brightness of light emitted by the red light module 132 to help a person or a vehicle behind the bicycle recognize, the red light module 132 is disposed on the bottom cover, where the bottom cover is a transparent end cover made of a transparent material.

Referring to FIG. 2, FIG. 3, and FIG. 4, FIG. 2 is a schematic structural diagram of an embodiment of a bicycle riding taillight with brake laser warning according to the present disclosure, FIG. 3 is a partial exploded diagram of an embodiment of a bicycle riding taillight with brake laser warning according to the present disclosure, and FIG. 4 is a schematic structural diagram of a bottom cover of an embodiment of a bicycle riding taillight with brake laser warning according to the present disclosure.

In this embodiment, the laser module 131 is a laser module that emits to form a circular structure, a square structure, or a long strip structure on the ground, and is disposed at one end of the bottom cover. The bottom cover is provided with a laser light outlet 131a corresponding to the laser module 131. The laser light outlet 131a is a circular laser light outlet. An included angle between an axis of the laser light outlet 131a and the ground is 8° to 13°. In this embodiment, the included angle between the axis of the laser light outlet 131a and the ground is 10°. In this embodiment, the laser module 131 is a laser module 131 that emits to form a circular structure on the ground. Since the included angle between the axis of the laser light outlet 131a and the ground is 10°, the high-brightness laser beam emitted by the laser module 131 is prevented from hitting the face of a person and affecting the sight of the person. In addition, a person and a vehicle behind the bicycle can clearly distinguish and respond in time.

Referring to FIG. 3, FIG. 3 is a partial exploded diagram of an embodiment of a bicycle riding taillight with brake laser warning according to the present disclosure.

The power source includes a charging port 14a; the charging port 14a is disposed in the middle of one side of the housing body and is configured to charge the power source, and a charging cover for covering the charging port is disposed at an upper end of the charging port. The charging cover is disposed to prolong service life of the power source, and prevent rain or sundries from entering the charging port 14a to affect charging in a muddy or wet condition.

Figure 5:
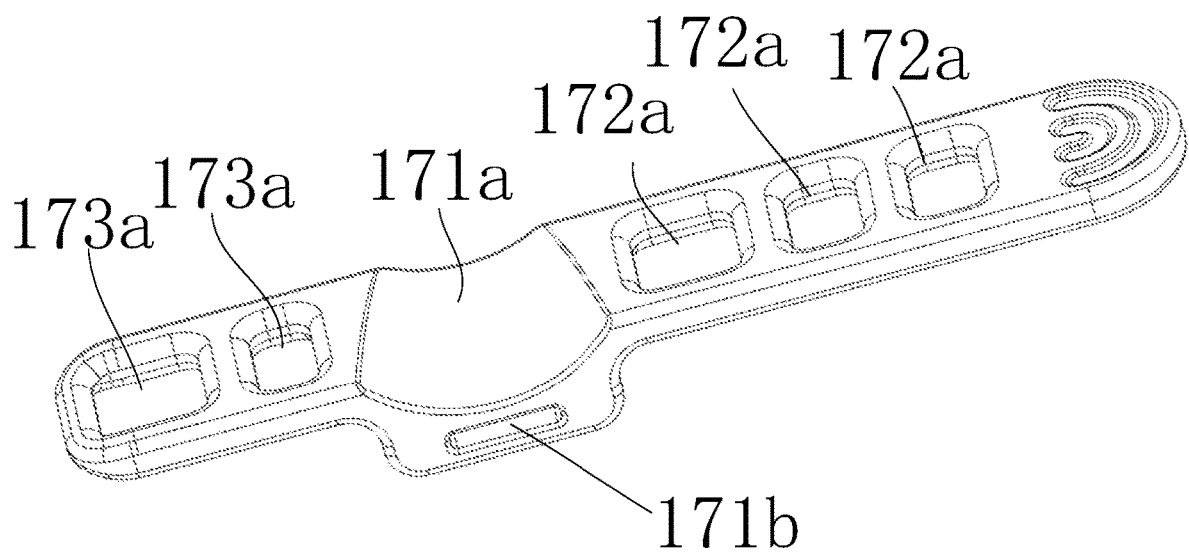
FIG. 5 is a schematic structural diagram of a fastening means of an embodiment of a bicycle riding taillight with brake laser warning according to the present disclosure.

Referring to FIG. 2, FIG. 3, and FIG. 5, FIG. 2 is a schematic structural diagram of an embodiment of a bicycle riding taillight with brake laser warning according to the present disclosure, FIG. 3 is a partial exploded diagram of an embodiment of a bicycle riding taillight with brake laser warning according to the present disclosure, and FIG. 5 is a schematic structural diagram of a fastening means of an embodiment of a bicycle riding taillight with brake laser warning according to the present disclosure.

An upper end face of the housing body is provided with a fastening means 17 fastened on the bicycle. The fastening means 17 includes a connecting portion 171 connected to the bicycle and a first binding portion 172 and a second binding portion 173 for binding. The first binding portion 172 and the second binding portion 173 are separately located on two sides of the connecting portion 171. The connecting portion 171 and the first binding portion 172 and the second binding portion 173 are an integral structure. The fastening means is detachably connected to the light housing. Because the fastening means 17 is fastened on the bicycle and frequently rubs against the bicycle, the fastening means 17 is prone to damage. When the fastening means 17 is detachably connected, a new fastening means 17 may be used as a replacement after the fastening means 17 is damaged, thereby improving resource utilization.

In addition, a surface of the connecting portion that is in contact with the bicycle is an arc concave surface 171a configured to stably fastened on the bicycle. An upper end surface of the housing body is provided with a connecting hook 19 detachably connected to the connecting portion 171, the connecting portion 171 is provided with a through hole 171b passing through the connecting portion, and the fastening means and the light housing are detachably connected to the connecting hook through the through hole. The second binding portion 173 is provided with a second fastening hole 173a, and the first binding portion 172 is provided with a first fastening hole 172a. The first binding portion is provided with a hook means 18, configured to fasten the light housing on the bicycle through the first fastening hole and the second fastening hole. The first fastening holes and the second fastening holes are provided in a plural number, and the hook means is detachably disposed on the first fastening hole. The fastening means is a flexible fastening means made of a flexible material. A plurality of first fastening holes and a plurality of second fastening holes are provided. When the fastening means is fastened on the bicycle, the fastening means may freely adjust fastening tightness according to a model number of the bicycle, thereby expanding an application scope of the fastening means.

Figure 6:
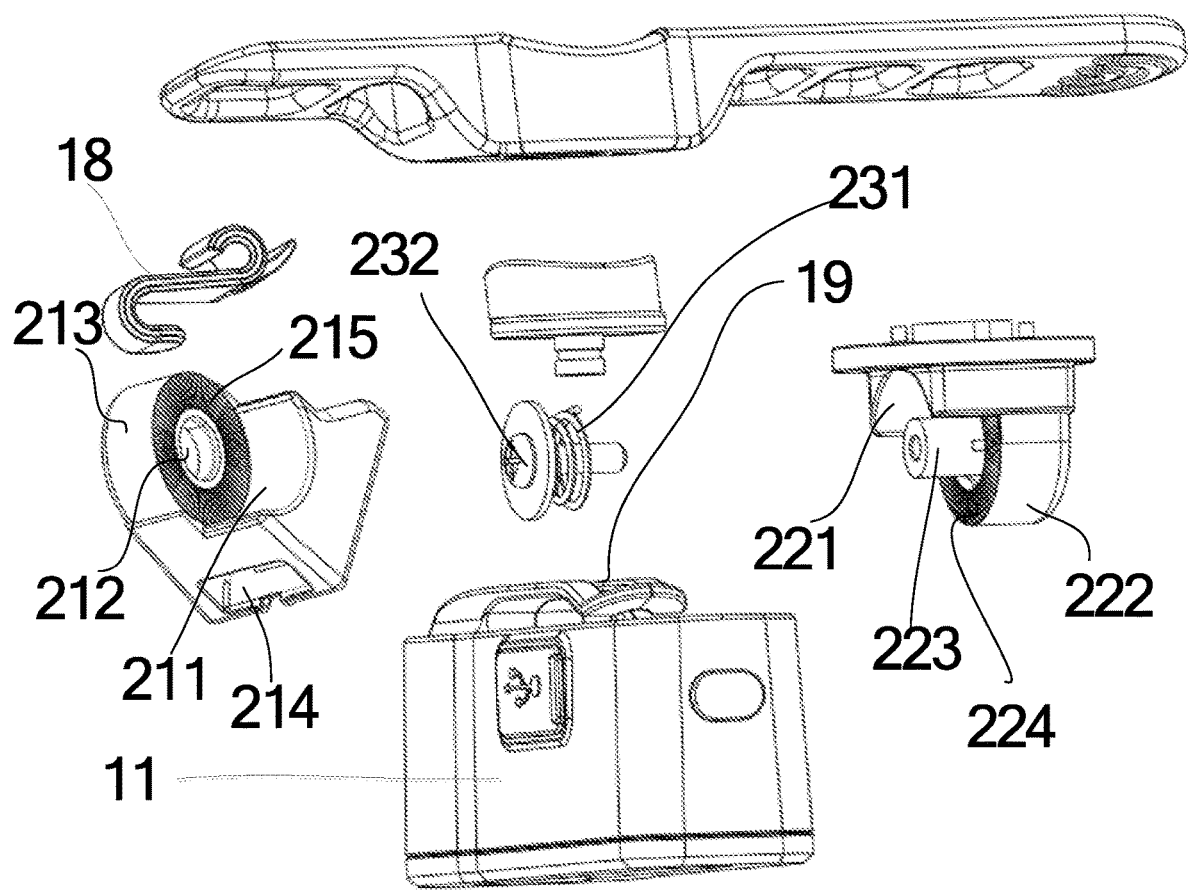
FIG. 6 is an exploded diagram of an embodiment of a bicycle riding taillight with brake laser warning according to the present disclosure.

Referring to FIG. 6, FIG. 6 is an exploded diagram of an embodiment of a bicycle riding taillight with brake laser warning according to the present disclosure.

As a variation of the foregoing preferred embodiment, in the bicycle riding taillight with brake laser warning of the present disclosure, an upper end surface of the housing body is provided with a fastening means fastened on the bicycle, and a connecting hook 19 detachably disposed on the fastening means. The fastening means includes: a first fastening rotating member, a second fastening rotating member, a spring member, and a binding member.

A lower portion of the first fastening rotating member is provided with a connection through slot 214 connected to the connecting hook, an upper portion of the first fastening rotating member is provided with a first cylindrical rotating connecting portion and a first arc-shaped connecting portion 211 connected to the first cylindrical connecting portion, and the first cylindrical rotating connecting portion includes a rotating through slot 212 located in the middle of the first cylindrical rotating connecting portion and a first arc rotating surface 213 located on top of the first cylindrical rotating connecting portion. A second fastening rotating member includes a cylindrical rotating connecting portion disposed at a lower portion of the second fastening rotating member, and a second arc-shaped connecting portion 221 connected to the cylindrical rotating connecting portion, where the cylindrical rotating connecting portion includes a second arc rotating surface 222 on top of the cylindrical rotating connecting portion, and a protruding cylinder 223 protruding outwards. One end of the binding member is fastened on the first fastening rotating member and the second fastening rotating member, and the other end of the binding member is fastened on the bicycle. The first fastening rotating member, the second fastening rotating member, and the binding member are connected through the spring member. The first fastening rotating member and the second fastening rotating member are rotatably connected, the connection through slot cooperates with the protruding cylinder, the first arc rotating surface cooperates with the second arc rotating surface, and the first arc-shaped connecting portion cooperates with the second arc rotating surface. In this embodiment, the first fastening rotating member is rotatably connected to the second fastening rotating member, so that the fastening means can be rotatably mounted on the bicycle, to help adjust an irradiation angle of the bicycle riding taillight with brake laser warning. In addition, because the first fastening rotating member is rotatably connected to the second fastening rotating member, a rotation range may include an angle of 30°, thereby expanding a range of the included angle between the axis of the laser light outlet 131a and the ground, and expanding a range of an adjustable field of vision of the taillight.

An end of the first cylindrical rotating connecting portion close to the first arc-shaped connecting portion is provided with a first latch 215; and an end of the cylindrical rotating connecting portion close to the second arc-shaped connecting portion is provided with a second latch 224. The spring member includes a tapping screw 232 and a spring 231, the tapping screw 232 passes through and is fastened on the first fastening rotating member, the second fastening rotating member, and the binding member, and the spring 231 is disposed between the first fastening rotating member and the second fastening rotating member. During rotation, the tapping screw 232 is loosened, the second fastening rotating member is rotated by the binding member, and the second latch 224 rotates and moves relative to the first latch 215, to adjust an angle of the housing body, thereby adjusting an angle at which the bicycle riding taillight with brake laser warning is mounted on the bicycle. After adjustment to a preset angle, the tapping screw is tightened, and the first latch 215 is fastened to the second latch 225.

The following describes a specific working principle of the bicycle riding taillight with brake laser warning of the present disclosure:

When a cyclist rides a bicycle at night and rides normally on a straight road, the photosensitive sensor detects that light is dark. Therefore, the photosensitive sensor detects and generates a first conduction signal and sends the first conduction signal to the circuit board. After the circuit board receives the first conduction signal, the circuit of the red light module is conducted, and the red light module is turned on to illuminate the rear, so as to provide a desirable field of vision for a pedestrian or a vehicle behind the bicycle. However, in the process of riding, when a road condition is bad, or the cyclist needs to stop, or the cyclist brakes, the vibration sensor detects that the bicycle brakes or makes a turn, and the vibration sensor generates a second conduction signal. The circuit board receives the second conduction signal and the circuit of the laser module is conducted. The laser module is turned on to emit a high-brightness laser beam. Because the high-brightness laser beam is not red light, and forms a distinct visual difference with the red warning light in a normal straight riding condition, so that a person or a vehicle behind the bicycle can quickly notice the change in the riding condition of the bicycle, and the person or the vehicle behind the bicycle can take proper evasive actions in time to reduce accidents.

The working principle of the bicycle riding taillight with brake laser warning is described above.

In conclusion, although preferred embodiments of the present disclosure are already disclosed above, the preferred embodiments are not intended to limit the present disclosure. A person of ordinary skill in the art can make various modifications and embellishments without departing from the spirit and scope of the present disclosure. Therefore, the protection scope of the present disclosure is subject to the scope defined by the claims.

What is claimed is:

1. A bicycle riding taillight with brake laser warning, comprising:
    a light housing comprising a housing body and a bottom cover sealing the housing body;
    a circuit board disposed inside the light housing;
    a light source device, disposed on an inner side of the bottom cover and electrically connected to the circuit board, and configured to provide lights of different modes;
    a power source disposed on one side of the circuit board, and configured to provide power for the light source device;
    a photosensitive sensor disposed at one end of the light housing and connected to the circuit board, and configured to sense ambient light; and
    a vibration sensor disposed inside the light housing and located at one end of the circuit board, and configured to sense a riding condition of a bicycle, wherein
    the vibration sensor is configured to transmit the sensed riding condition of the bicycle to the light source device, and the light source device is configured to turn on lights of different modes, and
    wherein an upper end face of the housing body is provided with a fastening means fastened on the bicycle; the fastening means comprises a connecting portion connected to the bicycle, and a first binding portion and a second binding portion for binding; the first binding portion and the second binding portion are separately located on two sides of the connecting portion; the connecting portion and the first binding portion and the second binding portion are an integral structure; and the fastening means is detachably connected to the light housing, and
    wherein a surface of the connecting portion in contact with the bicycle is an arc concave surface configured to stably fastened on the bicycle;
    an upper end surface of the housing body is provided with a connecting hook detachably connected to the connecting portion, the connecting portion is provided with a through hole passing through the connecting portion, and the fastening means and the light housing are detachably connected to the connecting hook through the through hole;
    the second binding portion is provided with a second fastening hole, and the first binding portion is provided with a first fastening hole;
    the first binding portion is provided with a hook means, configured to fasten the light housing on the bicycle through the first fastening hole and the second fastening hole; and
    a plurality of the first fastening holes and the second fastening holes are provided, and the hook means is detachably disposed at the first fastening hole.

2. The bicycle riding taillight of claim 1, wherein the light source device comprises a laser module and a red light module;
    the photosensitive sensor is configured to generate a first conduction signal in response to detecting that external light is insufficient, the circuit board is configured to receive the first conduction signal, a circuit of the red light module is conducted, and the red light module is turned on; and
    the vibration sensor is configured to generate a second conduction signal in response to detecting that the bicycle brakes or makes a turn, the circuit board is configured to receive the second conduction signal, and the laser module is turned on.

3. The bicycle riding taillight of claim 2, wherein the laser module is a color laser module, a blue laser module, a yellow laser module, or a green laser module; and
    the red light module is disposed on the bottom cover, and the bottom cover is a transparent end cover made of transparent material.

4. The bicycle riding taillight of claim 2, wherein the laser module is a laser module configured to emit laser light to form a circular structure, a square structure, or a long strip structure on the ground, and disposed at one end of the bottom cover, the bottom cover is provided with a laser light outlet corresponding to the laser module, and the laser light outlet is provided with a lens.

5. The bicycle riding taillight of claim 1, wherein: an upper end surface of the housing body is provided with a fastening means fastened on the bicycle, and a connecting hook detachably disposed at the fastening means; and
    the fastening means comprises:
    a first fastening rotating member, wherein a lower portion of the first fastening rotating member is provided with a connection through slot connected to the connecting hook, an upper portion of the first fastening rotating member is provided with a first cylindrical rotating connecting portion and a first arc-shaped connecting portion connected to the first cylindrical connecting portion, and the first cylindrical rotating connecting portion comprises a rotating through slot located in the middle of the first cylindrical rotating connecting portion and a first arc rotating surface located on top of the first cylindrical rotating connecting portion;
    a second fastening rotating member comprising a cylindrical rotating connecting portion disposed at a lower portion of the second fastening rotating member, and a second arc-shaped connecting portion connected to the cylindrical rotating connecting portion, wherein the cylindrical rotating connecting portion comprises a second arc rotating surface on top of the cylindrical rotating connecting portion, and a protruding cylinder protruding outwards;

a binding member, wherein one end of the binding member is fastened on the first fastening rotating member and the second fastening rotating member, and the other end of the binding member is fastened on the bicycle; and a spring member, wherein the first fastening rotating member, the second fastening rotating member, and the binding member are connected through the spring member, wherein the first fastening rotating member and the second fastening rotating member are rotatably connected, the connection through slot is configured to cooperate with the protruding cylinder, the first arc rotating surface is configured to cooperate with the second arc rotating surface, and the first arc-shaped connecting portion is configured to cooperate with the second arc rotating surface.

6. The bicycle riding taillight of claim 5, wherein: an end of the first cylindrical rotating connecting portion close to the first arc-shaped connecting portion is provided with a first latch; and an end of the cylindrical rotating connecting portion close to the second arc-shaped connecting portion is provided with a second latch; and the spring member comprises a tapping screw and a spring, the tapping screw passes through and is fastened on the first fastening rotating member, the second fastening rotating member, and the binding member, and the spring is disposed between the first fastening rotating member and the second fastening rotating member.

7. The bicycle riding taillight of claim 1, wherein an included angle between an axis of the laser light outlet and the ground is 8° to 13°.

8. The bicycle riding taillight of claim 1, wherein: the power source comprises a charging port; the charging port is disposed in the middle of one side of the housing body and is configured to charge the power source, and a charging cover for covering the charging port is disposed at an upper end of the charging port.

\* \* \* \* \*